United States Patent
Nakano

(10) Patent No.: US 9,069,471 B2
(45) Date of Patent: Jun. 30, 2015

(54) PASSING HINT OF PAGE ALLOCATION OF THIN PROVISIONING WITH MULTIPLE VIRTUAL VOLUMES FIT TO PARALLEL DATA ACCESS

(75) Inventor: Takahiro Nakano, Lexington, MA (US)

(73) Assignee: HITACHI, LTD., Tokyo (JP)

( * ) Notice: Subject to any disclaimer, the term of this patent is extended or adjusted under 35 U.S.C. 154(b) by 160 days.

(21) Appl. No.: 13/249,310

(22) Filed: Sep. 30, 2011

(65) Prior Publication Data

US 2013/0086317 A1     Apr. 4, 2013

(51) Int. Cl.
G06F 12/08     (2006.01)
G06F 12/06     (2006.01)
G06F 3/06     (2006.01)

(52) U.S. Cl.
CPC ............ G06F 3/0613 (2013.01); G06F 3/0631 (2013.01); G06F 3/0643 (2013.01); G06F 3/0685 (2013.01)

(58) Field of Classification Search
CPC ....................................................... H04L 29/06
USPC .......................................................... 711/114
See application file for complete search history.

(56) References Cited

U.S. PATENT DOCUMENTS

| | | | | |
|---|---|---|---|---|
| 6,038,570 | A * | 3/2000 | Hitz et al. ............................... | 1/1 |
| 7,424,574 | B1 * | 9/2008 | Ahrens et al. ................... | 711/114 |
| 8,261,016 | B1 * | 9/2012 | Goel ............................... | 711/114 |
| 2002/0161855 | A1 * | 10/2002 | Manczak et al. ............... | 709/219 |
| 2003/0070043 | A1 * | 4/2003 | Merkey .......................... | 711/114 |
| 2004/0133570 | A1 * | 7/2004 | Soltis ................................. | 707/3 |
| 2005/0043978 | A1 * | 2/2005 | Chainer et al. ..................... | 705/7 |
| 2005/0102551 | A1 * | 5/2005 | Watanabe ......................... | 714/5 |
| 2006/0167838 | A1 * | 7/2006 | Lacapra ........................... | 707/2 |
| 2008/0126734 | A1 * | 5/2008 | Murase .......................... | 711/170 |
| 2009/0013016 | A1 * | 1/2009 | Noll et al. ..................... | 707/205 |

FOREIGN PATENT DOCUMENTS

WO     WO 2010099715 A1 *  9/2010

OTHER PUBLICATIONS

IBM TotalStorage SAN File System 2.2.2, Jan. 2006, Fourth Edition, chapters 1-3.*

* cited by examiner

*Primary Examiner* — Aimee Li
*Assistant Examiner* — Kenneth Tsang
(74) *Attorney, Agent, or Firm* — Mattingly & Malur, PC

(57) ABSTRACT

An information system comprises: a storage system including a processor, a memory, and a plurality of virtual volumes to be allocated pages from a storage pool of volumes; and a metadata server which, upon receiving from a client a write request containing file data to be written to a virtual volume in the storage system, returns the write request to the client with parallel information which is added to a data layout of the file data to be written in the virtual volume. The storage system, upon receiving the write request with the parallel information, allocates, based on the parallel information, pages from the storage pool to the virtual volume for writing the file data, so that the data layout is striped and the allocated pages fit striped data access according to the striped data layout.

14 Claims, 13 Drawing Sheets

PASSING HINT OF PAGE ALLOCATION OF THIN PROVISIONING WITH MULTIPLE VIRTUAL VOLUMES FIT TO PARALLEL DATA ACCESS

BACKGROUND OF THE INVENTION

The present invention relates generally to storage systems and, more particularly, to a network file sharing system with storage thin provisioning management.

Block storage systems utilizing thin-provisioning can reduce the storage cost. Thin provisioning provides virtual volumes whose capacity is virtualized. Initially, a virtual volume has no allocated real storage area. Once data write reaches to the virtual volume, the storage system allocates a region of real storage area to hold the data in its region. A unit of allocating a region of real storage area is called a page. Thin provisioning prevents the allocation of a page to the region when it is not used in the virtual volume. A user can define a volume with a sufficiently large size for future use without having the whole amount of real storage device. A file storage system provides file sharing and storing service over the network. It manages files. A file has a name and data and properties.

A file storage system can use thin provisioning as its storage. The file storage system defines a file system on a virtual volume. A new file sharing protocol known as pNFS is standardized by RFC5661 and its block layout by RFC5663. A file storage system is divided to two portions. One portion is metadata management portion; the other is storage portion. The metadata management portion manages a file namespace and each file metadata including the data layout in the storage at the MDS (MetaData Server). Storage can be multiple and works parallel to enhance the performance of data transmission. With real storages, it is possible to accelerate data transmission by partitioning large data to store them as stripes to multiple storages. When a client reads the data, the client issues read requests to storages simultaneously to access data at once. The data transfer rate is multiple times of a single storage.

However, it is difficult to use a thin provisioning system for a file storage system that shares the pool volume among the virtual volumes. The thin provisioning system is targeted to reduce the storage cost, and its page allocation mechanism is focused on how cost efficient it is to the system. It is not aware that two pages can be read simultaneously. Once the allocation of pages of virtual volumes belongs to one LU, the data will be read sequentially even if the client requests data to be read in parallel.

US2008/0126734A1 discloses a storage extent allocation method for thin provisioning storage. This shows how to allocate a page from multiple RAID groups to improve page data access performance. In the parallel NFS, a client requests a file read to the metadata server. The metadata server returns the layout of the file requested to the client. The client will issue a read request to the volumes designated by the layout. This mechanism allows the client to read or write data to multiple volumes in parallel as one file. Large file read and write performance will be accelerated by the parallel data processing.

As an example of data creation in the case of parallel computing, each node computes a part of result data and writes out the result data to the part of the result file. The timing of write out of each node may be at random. Thus, the order of the parts of the file is not sequential. The layout of the file will be striped among some thin provisioning virtual volumes sharing a storage pool. Then, the thin provisioning system allocates pages to the virtual volumes on demand. The allocated pages are not aware of the file layout. Each node will read the whole file as a source data to compute the next result data, and the nodes will issue read requests in parallel to the virtual volumes. The pages of the requested volumes to be read may have been allocated in the same physical storage device, and the storage device will have to read one page at a time. In that case, the read performance is limited to the performance of the physical storage device and is the same as a sequential read request even if the storage system has enough amounts of physical storage devices and physical storage device control interfaces to read data in parallel.

BRIEF SUMMARY OF THE INVENTION

Exemplary embodiments of the invention provide a network file sharing system with storage thin provisioning management. A file server is divided to a metadata management portion and a storage portion such as pNFS with block layout enabled to support thin provisioning volumes sharing a storage pool. A technique is presented for instructing the storage system to allocate pages so that the data layout will be striped and to allocate page(s) from the storage pool to fit with the striped data access. This invention is useful for file servers especially for high-performance computing data storage.

In accordance with an aspect of the present invention, an information system comprises: a storage system including a processor, a memory, and a plurality of virtual volumes to be allocated pages from a storage pool of volumes; and a metadata server which, upon receiving from a client a write request containing file data to be written to a virtual volume in the storage system, returns the write request to the client with parallel information which is added to a data layout of the file data to be written in the virtual volume. The storage system, upon receiving the write request with the parallel information, allocates, based on the parallel information, pages from the storage pool to the virtual volume for writing the file data, so that the data layout is striped and the allocated pages fit striped data access according to the striped data layout.

In some embodiments, the parallel information has two parts, a first part being an index indicating a position of the file data in a stripe width and a second part being the stripe width indicating into how many volumes the file data is striped. The stripe width is determined by file size of the file data and configuration of the volumes. A stripe size is a data size representing a unit size to stripe file data to the virtual volumes in the storage pool. If the file size is smaller than the stripe size, the stripe width is 1, if the file size is larger than the stripe size and smaller than twice the stripe size, the stripe width is 2, and if the file size is larger than a product of a number of the virtual volumes in the storage pool multiplied by the stripe size, the stripe width is the number of virtual volumes.

In specific embodiments, the storage system selects pages from the storage pool to be allocated to the virtual volume for writing the file data according to P mod N=n, where P is a number representing parallel capacity of the storage pool, the parallel capacity meaning how many volumes can be accessed simultaneously, where N is the stripe width of the parallel information, and where n is the index of the parallel information. For each page allocation, the storage system selects a page from a parallel group which satisfies P mod N=n in the storage pool and allocates the page to a target region of the virtual volume, the storage pool including P number of parallel groups. Logical units in each parallel group can be operated simultaneously to execute read/write data transfer simultaneously. The logical units in each parallel group are controlled by a same storage controller of the storage system. The logical units in each parallel group belong to a same RAID group or a same hard disk drive.

In accordance with another aspect of the invention, a storage system comprises: a processor; a memory; a plurality of virtual volumes to be allocated pages from a storage pool of volumes; and a storage write module configured to receive a write request with parallel information, the write request containing file data to be written to a virtual volume in the storage system, the parallel information being added to a data layout of the file data to be written in the virtual volume. The storage write module, upon receiving the write request with the parallel information, allocates, based on the parallel information, pages from the storage pool to the virtual volume for writing the file data, so that the data layout is striped and the allocated pages fit striped data access according to the striped data layout.

Another aspect of the present invention is directed to a page allocation method in a system which includes a storage system, a metadata server, and a client coupled via a network, the storage system including a processor, a memory, and a plurality of virtual volumes to be allocated pages from a storage pool of volumes. The method comprises: adding, by the metadata server, parallel information to a data layout of file data which is contained in a write request from the client and which is to be written in a virtual volume in the storage system; and allocating by the storage system, based on the parallel information, pages from the storage pool to the virtual volume for writing the file data, so that the data layout is striped and the allocated pages fit striped data access according to the striped data layout.

These and other features and advantages of the present invention will become apparent to those of ordinary skill in the art in view of the following detailed description of the specific embodiments.

DETAILED DESCRIPTION OF THE INVENTION

Figure 1:
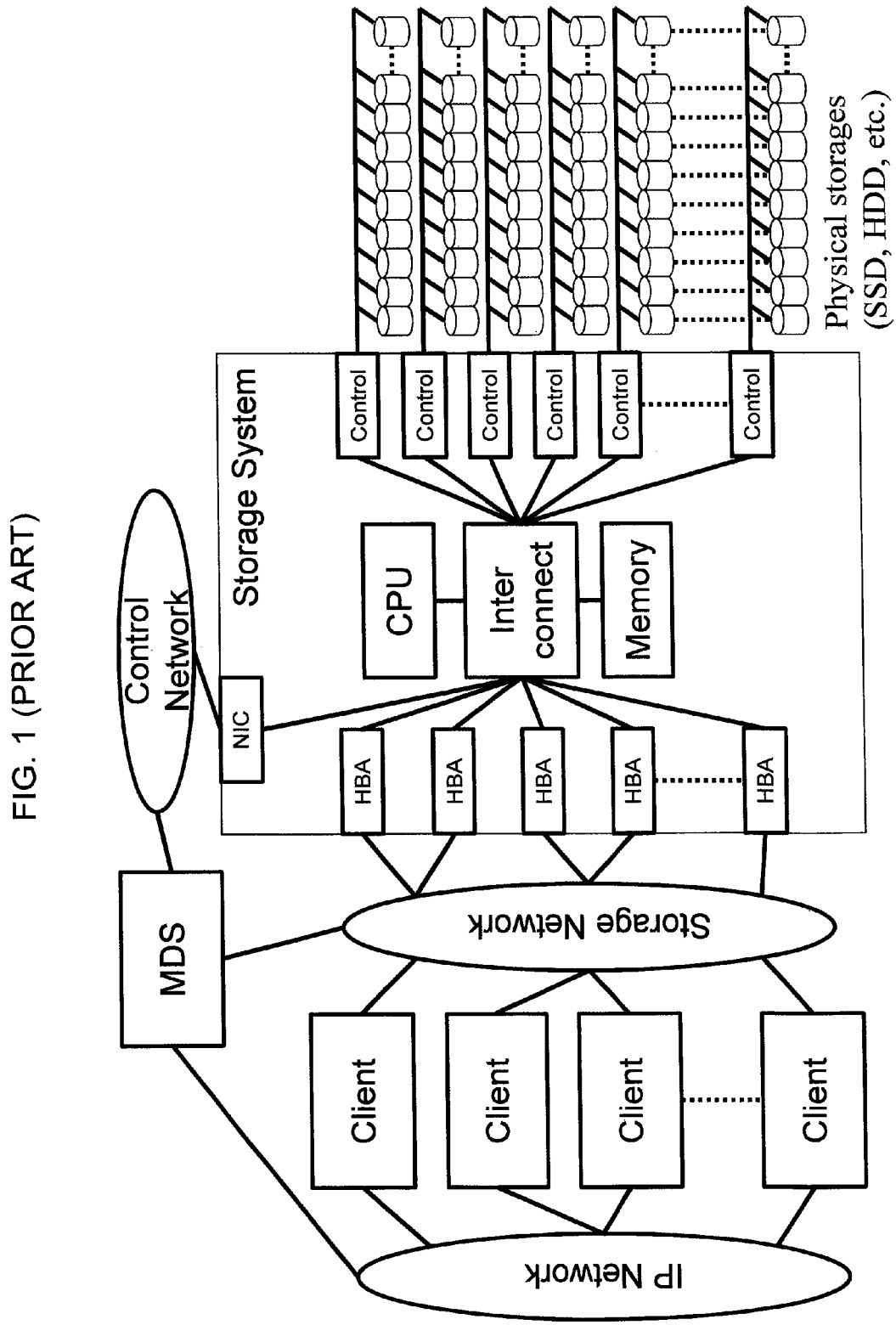
FIG. 1 illustrates an example of a hardware configuration of a known information system.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for a network file sharing system with storage thin provisioning management. A file server is divided to a metadata management portion and a storage portion such as pNFS with block layout enabled to support thin provisioning volumes sharing a storage pool. A technique is presented for instructing the storage system to allocate page(s) so that the data layout will be striped and to allocate page(s) from the storage pool to fit with the striped data access.

In specific embodiments, a metadata server knows the layout of the file. The parallel information is added to the layout of the file to be passed to the clients. The parallel information includes the width of parallel volumes and the index in the width. The width is determined by the file size and the configuration of the volumes. The stripe size is a data size representing a unit size to stripe file data to virtual volumes. If the file size is smaller than the stripe size, the width is 1. If the file size is larger than the stripe size and smaller than twice the stripe size, then the width is 2. If the file size is larger than the product of the number of virtual volumes multiplied by the stripe size, then the width is the number of virtual volumes. The index is determined by the file size and the width.

The client adds the parallel information to the write request to the volume so as to provide the parallel information to the storage system. The storage system will get the write request with the parallel information. If the location where the write request is directed is a page that is not allocated, the thin provisioning system will start to select a free page. In the page selection process, the parallel information is used. One assumes P is the number representing parallel capacity of the storage pool. The parallel capacity means how many volumes can be accessed simultaneously. One assumes N is the number of the width of the parallel information and n is the number of the index of the parallel information. For example, one selects one page from the parallel groups of following equation: P mod N=n. One allocates the selected page to the page of the virtual volume.

FIG. 1 illustrates an example of a hardware configuration of a known information system. The pNFS MDS and pNFS clients are connected with an IP network. All pNFS clients, pNFS MDS, and storage system HBAs (Host Bus Adapters) are connected with the storage network (e.g., FC, FCoE, iSCSI). The pNFS MDS and storage system are connected with a control network. It is also an IP network (generic terminology), but is isolated or different segment from the "IP Network." The storage system has a CPU, a memory, an interconnect, and controllers. Each controller is provided to control physical disks (e.g., SAS Controller, SATA Controller, SCSI Controller, FC Controller, and so on).

Figure 2:
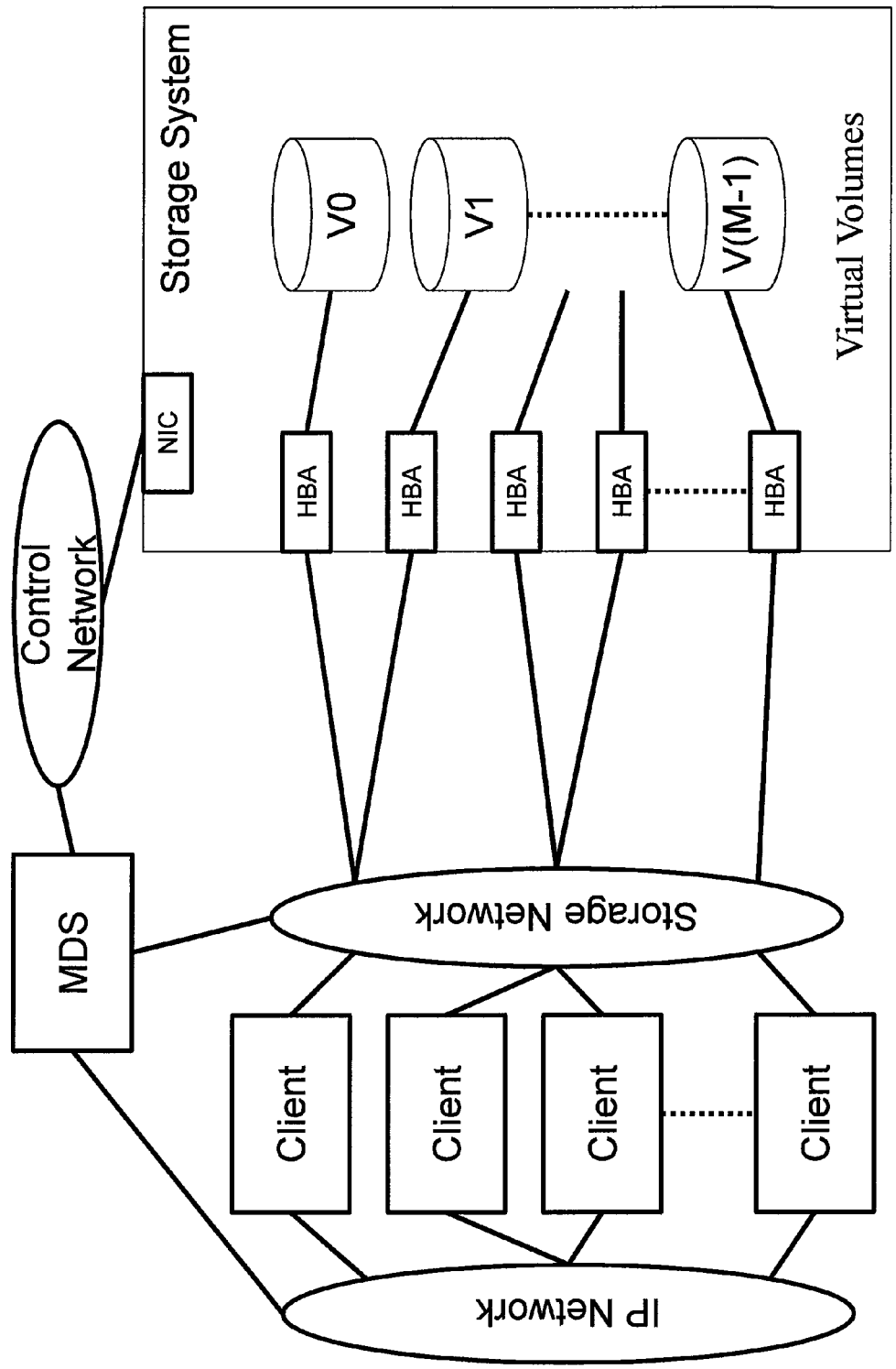
FIG. 2 illustrates an example of a hardware configuration of an information system in which the method and apparatus of the invention may be applied.

FIG. 2 illustrates an example of a hardware configuration of an information system in which the method and apparatus of the invention may be applied. The storage system provides virtual volumes V0 to V(M−1). Each Vn is accessible from all pNFS clients and pNFS MDS. The HBA (or port) can be shared. According to the pNFS way, the MDS write volume labels on each volumes unique name in somewhere. The reply of GETDEVINFO request from clients includes the volume information list. In the list, they define each volume. It is easy to identify two pieces of information in the list. One is the byte offset in the volume of the volume name that is written and the rest is the volume name.

Figure 3:
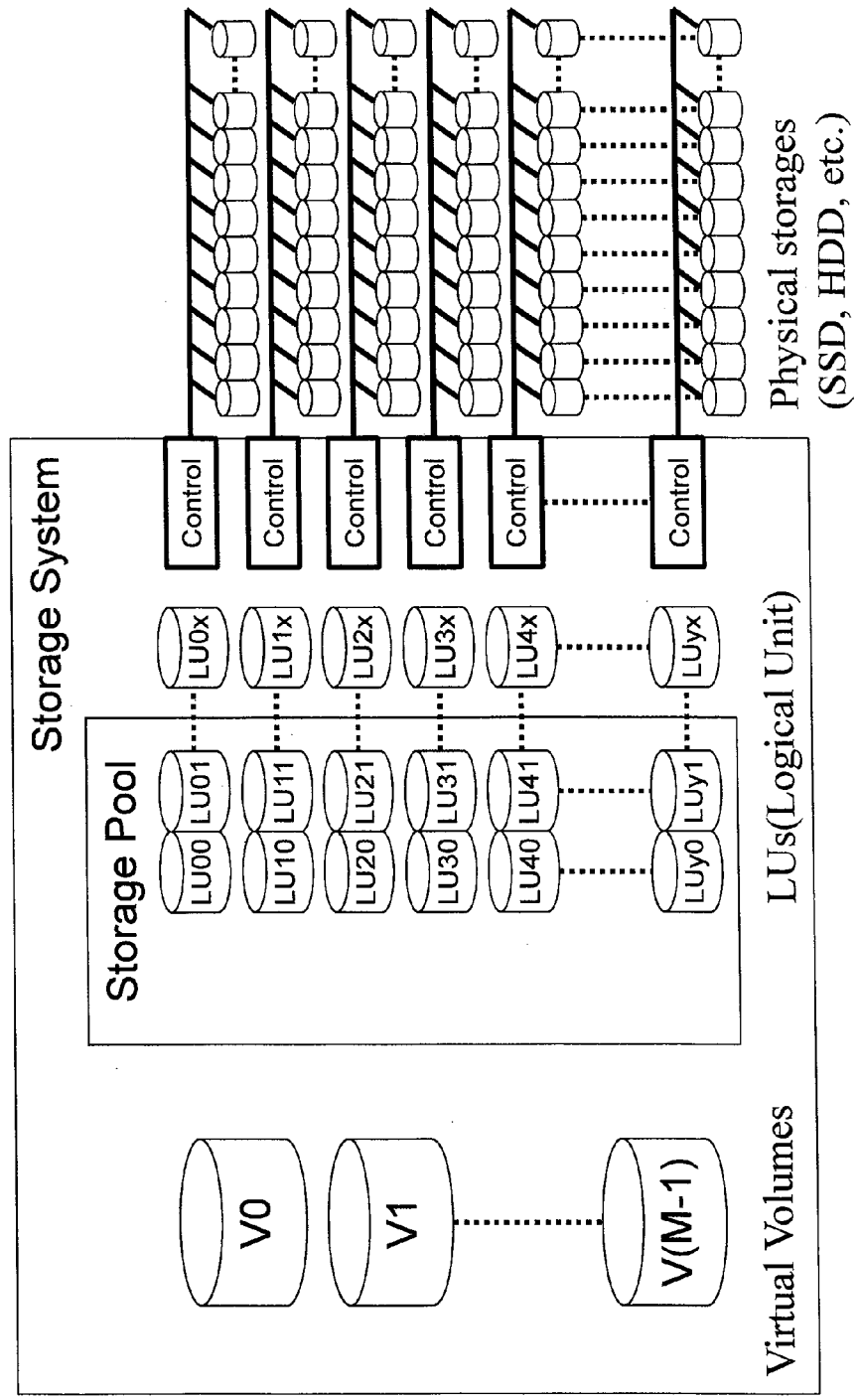
FIG. 3 illustrates an example of a storage system configuration of the storage.

FIG. 3 illustrates an example of a storage system configuration of the storage. All Vns are sharing the storage pool. The storage pool includes a lot of LUs (logical Units). Logical Units are defined on RAID groups. The storage has many storage controllers and many HDDs to transfer data simultaneously.

Figure 4:
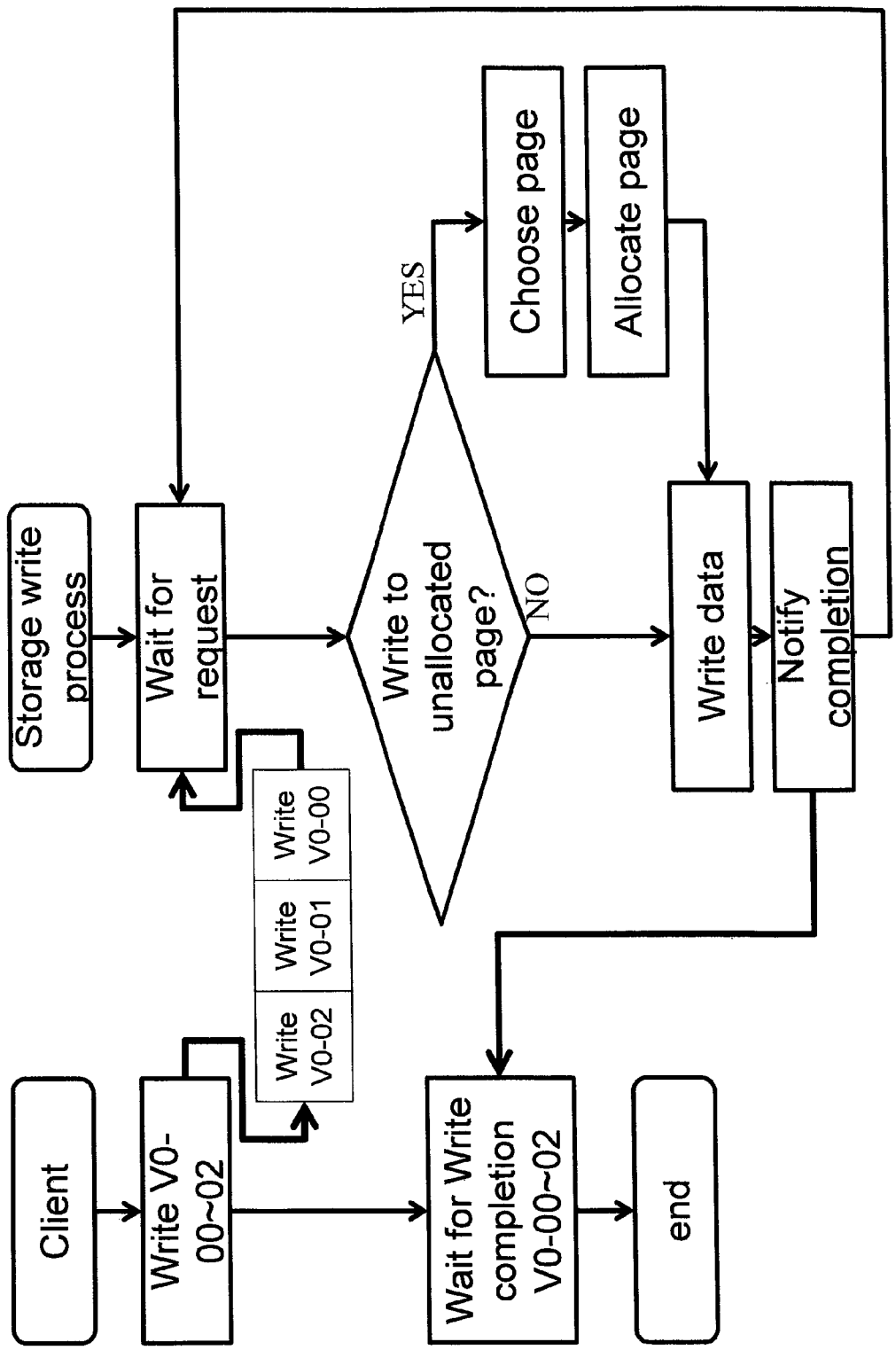
FIG. 4 shows an example of a flow diagram of standard data write operation to the thin provisioned virtual volume.

FIG. 4 shows an example of a flow diagram of standard data write operation to the thin provisioned virtual volume. When a client wants to write data, the client sends a write request to the storage system. The storage write process is stored in the memory of the storage system and executed by the CPU in the storage system. The storage write process waits for the write request from the clients. Once it receives the write request, it checks whether the target region of the virtual volume has already been allocated a page or not. If it has not, the storage write process chooses a page from the storage pool and allocates the page to the target region of the virtual volume. It writes data to the region, and notifies the completion of data write when the data has been written to the region. When the client receives the write completion notification from the storage system, the process is finished.

Figure 5:
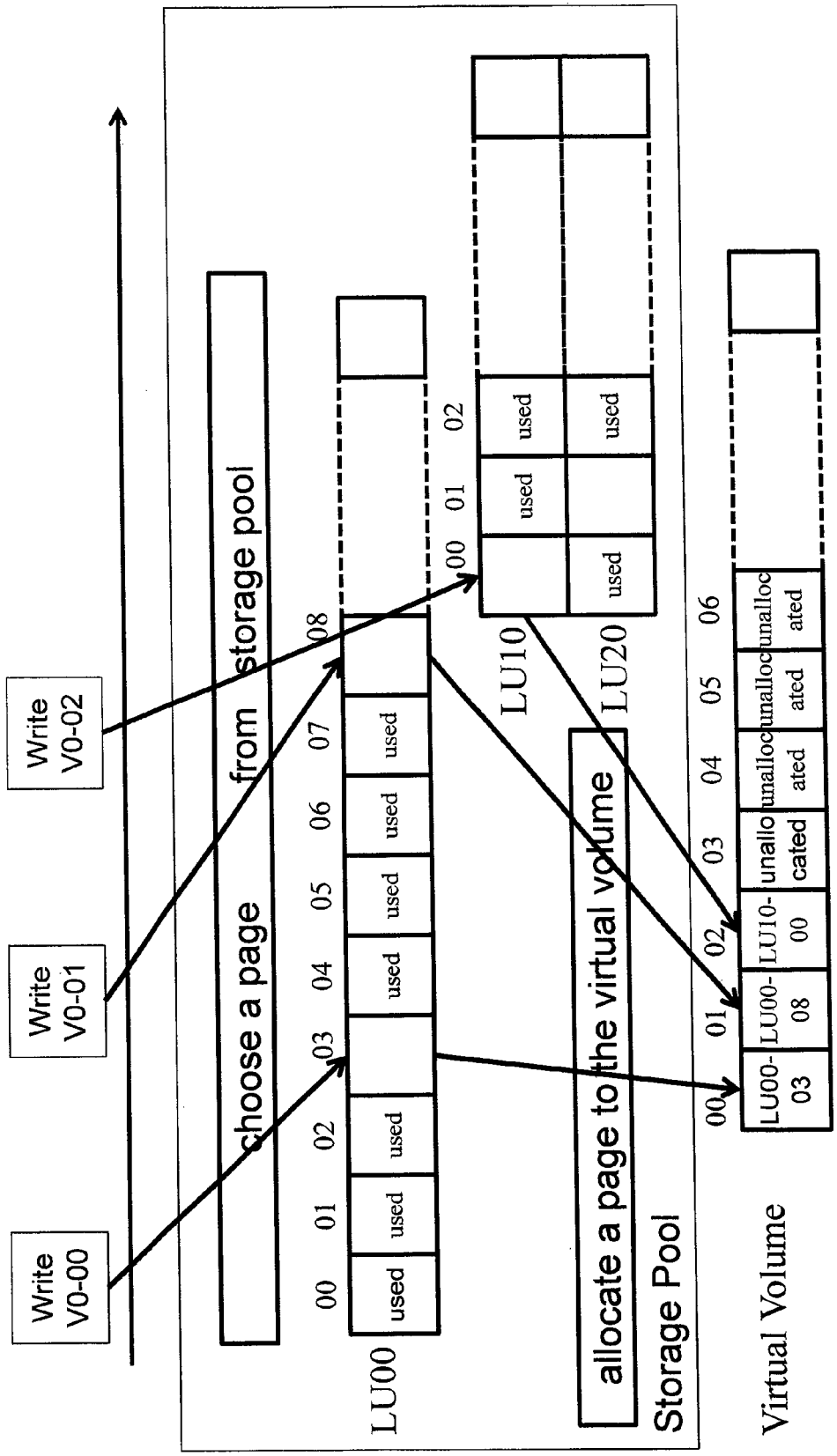
FIG. 5 illustrates an example of the page allocation mechanism.

FIG. 5 illustrates an example of the page allocation mechanism. The time frame moves from left to right. Each box represents a write request from a client. For each write request, the write process chooses a free page from some LUs in the storage pool, and allocates it to the target region of the virtual volume.

Figure 6:
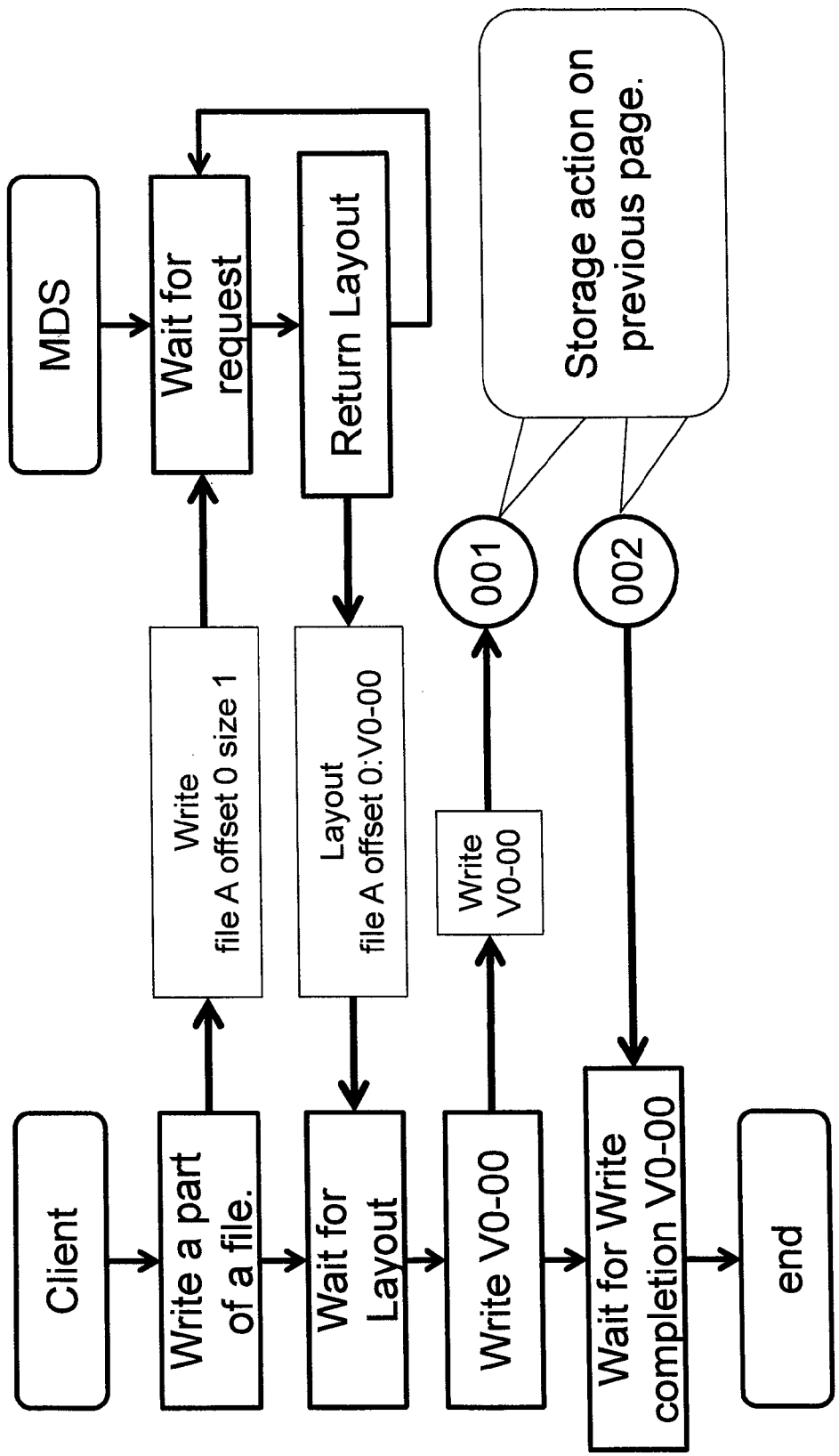
FIG. 6 illustrates an example of a standard pNFS write process with block layout support.

FIG. 6 illustrates an example of a standard pNFS write process with block layout support. When a client wants to write data to a file, it sends a write request along with pNFS protocol to the MDS. The MDS write process waits for a write request from the clients. Once it receives the write request, it returns the layout of the data that should be written in the volumes to the client. When the client receives the layout, it sends the write request along with SCSI protocol to the storage system. The storage system acts as shown in FIG. 4 (standard data write operation to the thin provisioned virtual volume) and FIG. 5 (page allocation). When the client receives the write completion notification from the storage system, the process of FIG. 6 is finished.

Figure 7:
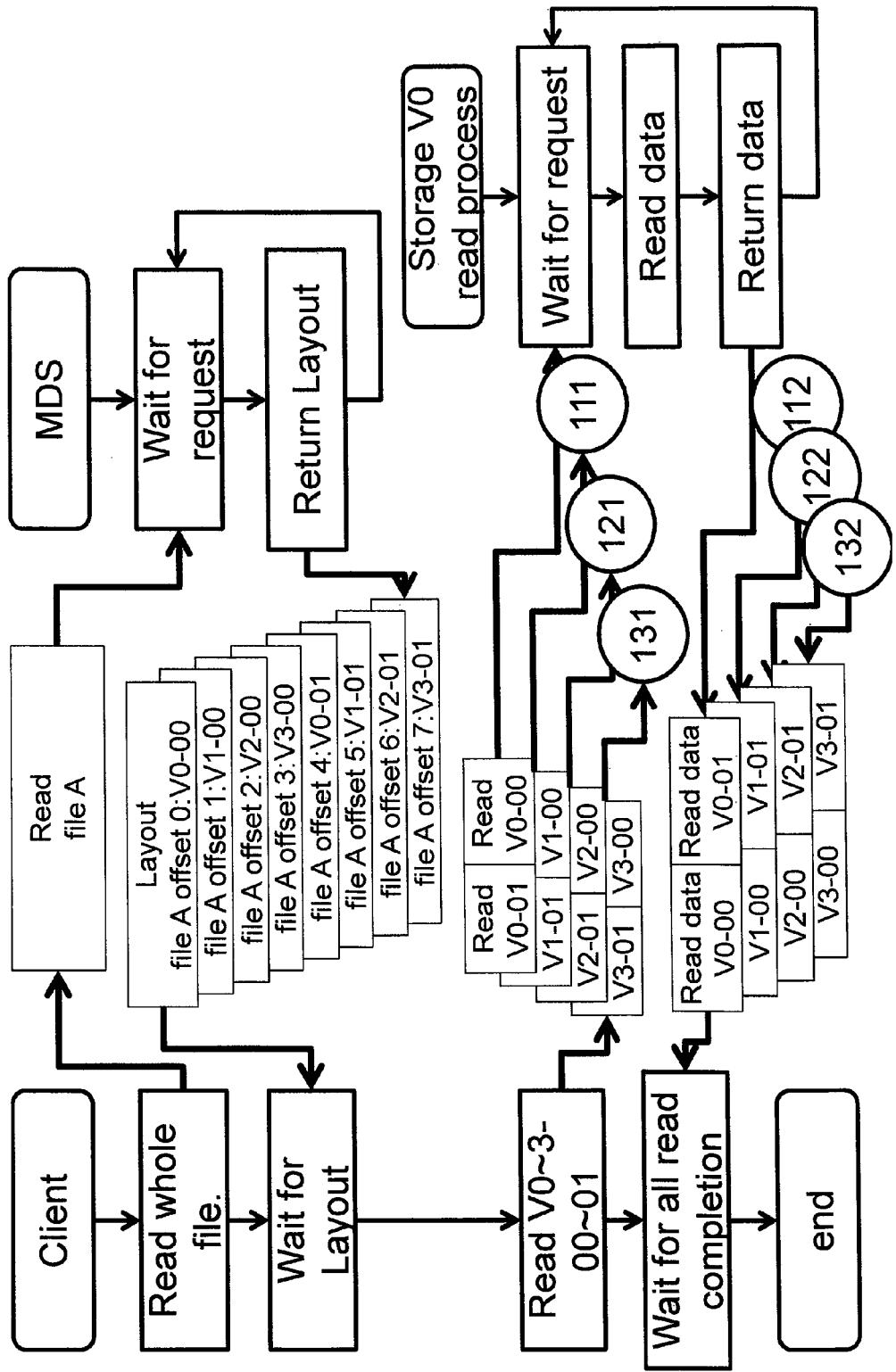
FIG. 7 illustrates an example of a pNFS parallel read process.

FIG. 7 illustrates an example of a pNFS parallel read process. When a client wants to read a file, it sends a read request to the MDS. The MDS read process waits for a read request from the clients. Once it receives the read request, it returns the layouts of the data that should be read in the volumes to the client. When the client receives the layouts, it sends the read request along with SCSI protocol to the storage system. If there are requests for different volumes in the layouts, it sends these requests to the storage system at once (i.e., simultaneously). One or more storage read processes are allocated to each volume. The storage read process waits for a read request from the clients. Once it receives the read request, it reads data from the region on virtual volume. The page on the virtual volume is mapped to the real storage area on the LUs. Actual data is read from the area of the real storage. The storage read process returns the read data to the client. When the client has received all of the read data, the process is finished.

Figure 8:
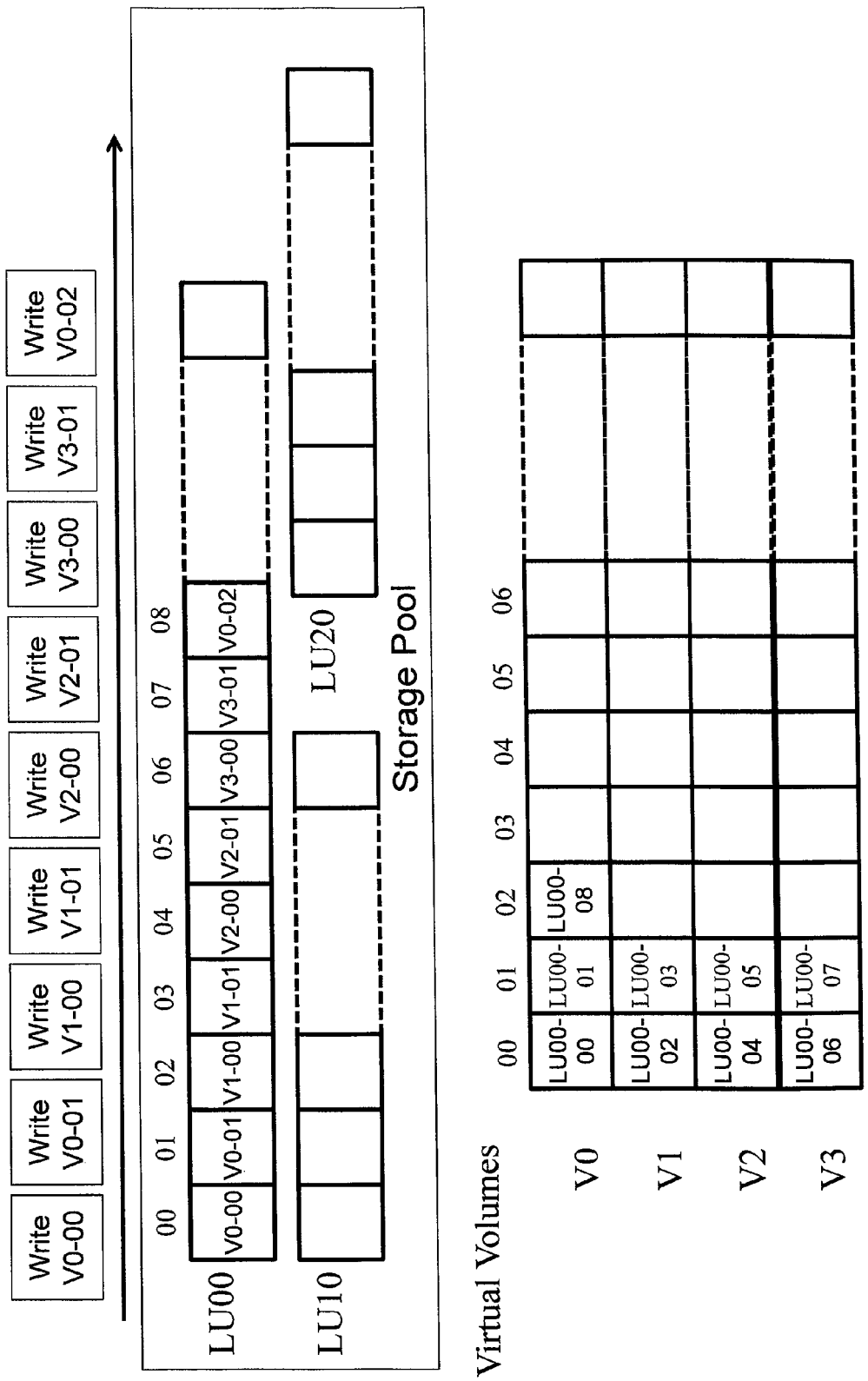
FIG. 8 illustrates an example of a flow diagram of standard pNFS data written to the thin provisioned virtual volume under the page allocation mechanism.

FIG. 8 illustrates an example of a flow diagram of standard pNFS data written to the thin provisioned virtual volume under the page allocation mechanism. FIG. 8 is similar to FIG. 5, but there are multiple virtual volumes in FIG. 8. When clients request data write to the storage system at random sequence, the page allocation process allocates pages. Then, the pages in the virtual volumes are allocated without awareness of parallel access. In this example, the pages are allocated from LU00 and demanded by the sequence of request.

Figure 9:
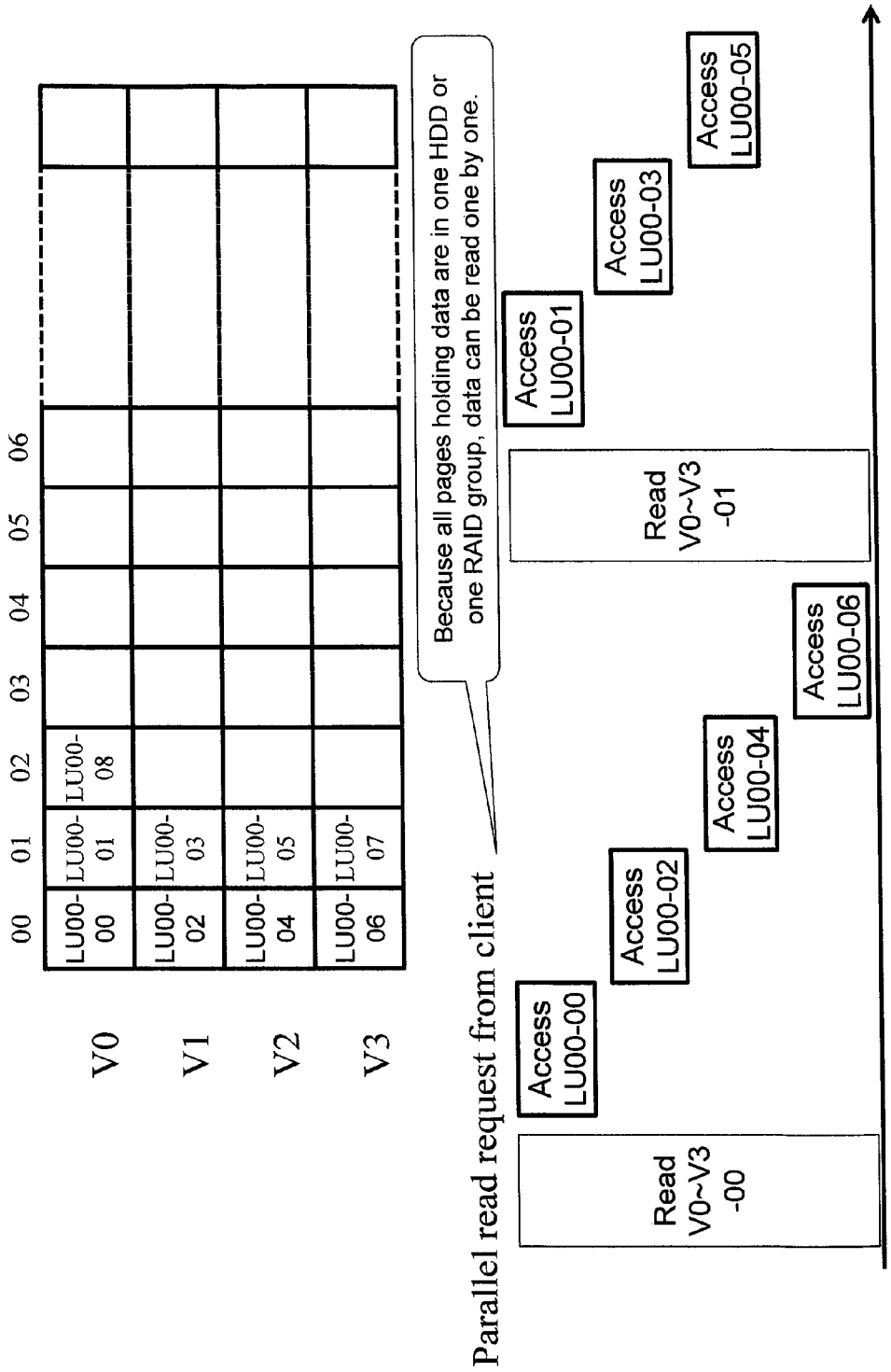
FIG. 9 illustrates what happens to parallel read in the standard page allocation case of FIG. 8.

FIG. 9 illustrates what happens to parallel read in the standard page allocation case of FIG. 8. A client sends a read request for each of the virtual volumes. Each virtual volume's storage read process starts the read process. However, all requests come to the same real storage using LUOO. A physical HDD can read one region of data at once. Thus, the data will be read sequentially as shown at the bottom of FIG. 9. This shows that if the virtual volume's page allocation is not good, the read performance would not improved even when pNFS supports parallel read function. This is the problem. One easy solution is to separate the storage pool for each virtual volume, but it will result in too many pools and the number of unused and unusable pages will be increased. This is due to the fact that one virtual volume out of the pNFS use would be sufficient, but unused page from a different storage pool of the virtual volume cannot be allocated. In specific embodiments of the present invention, information of parallel set carries from the MDS to the storage system.

Figure 10:
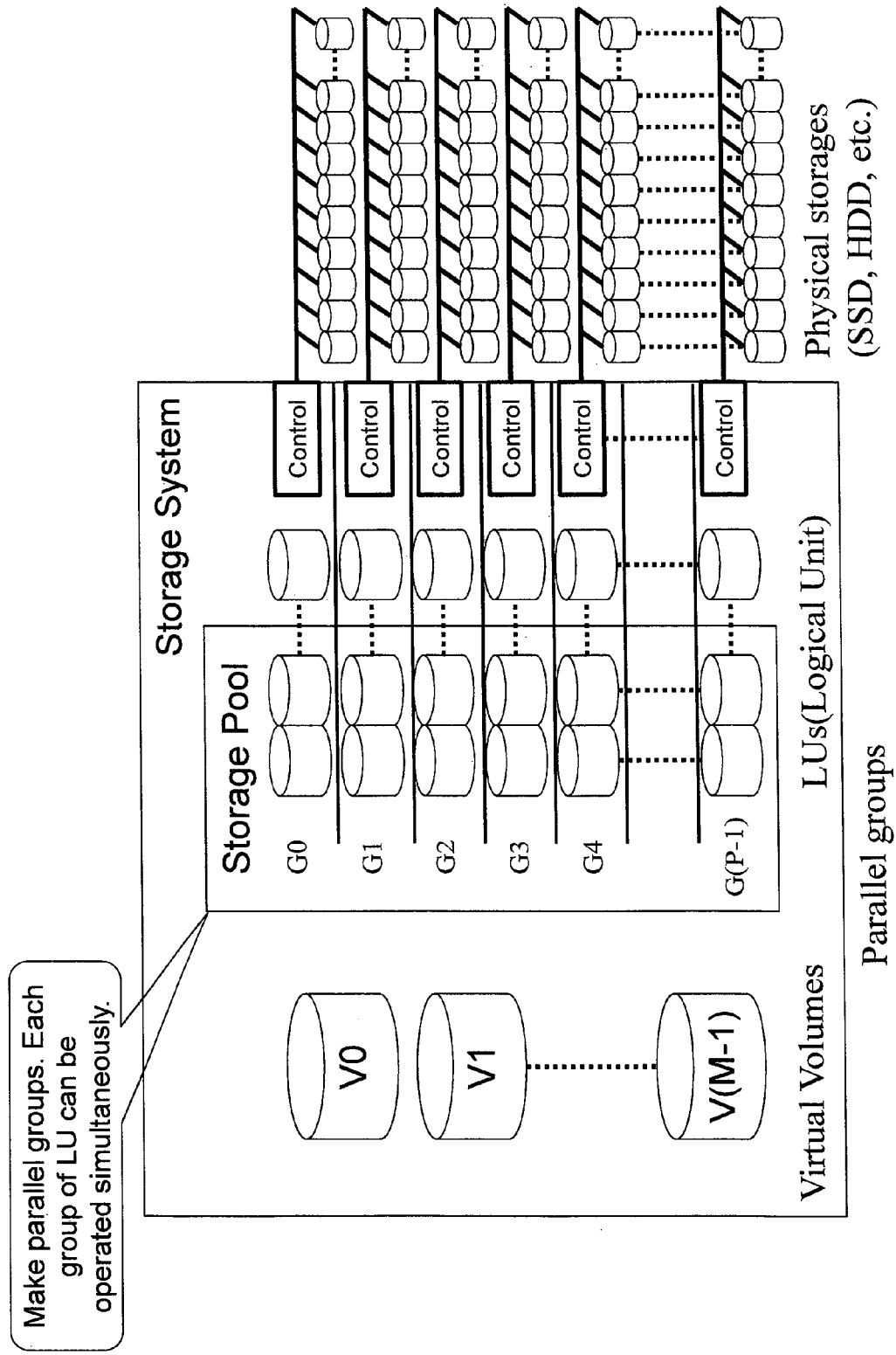
FIG. 10 illustrates an example of a storage system configuration showing changes as compared to FIG. 3 according to an embodiment of the present invention.

FIG. 10 illustrates an example of a storage system configuration showing changes as compared to FIG. 3 according to an embodiment of the present invention. FIG. 10 is almost the same as FIG. 3. The embodiment in FIG. 10 defines parallel groups in the storage pool. The LUs in each of the different parallel groups can be operated simultaneously. Some examples of parallel groups are as follows. First, a parallel group consists of the LUs that are controlled by the same controller. Each controller can control its HDDs individually. They can execute read/write data transfer simultaneously. Second, a parallel group consists of the LUs that belong to the same RAID group or same HDD. Even if the controller is shared, the technologies to control multiple HDDs exist. For example, SCSI3 defines a disconnection function to be able to issue other requests. RAID group is built by some HDDs to provide good performance and redundancy. If one can permit the data transfer or control command communications are serialized, but HDDs can work simultaneously, that will be able to assume as a parallel. It is assumed here that the number of parallel groups is P (i.e., group number 0 to group number P−1).

Figure 11:
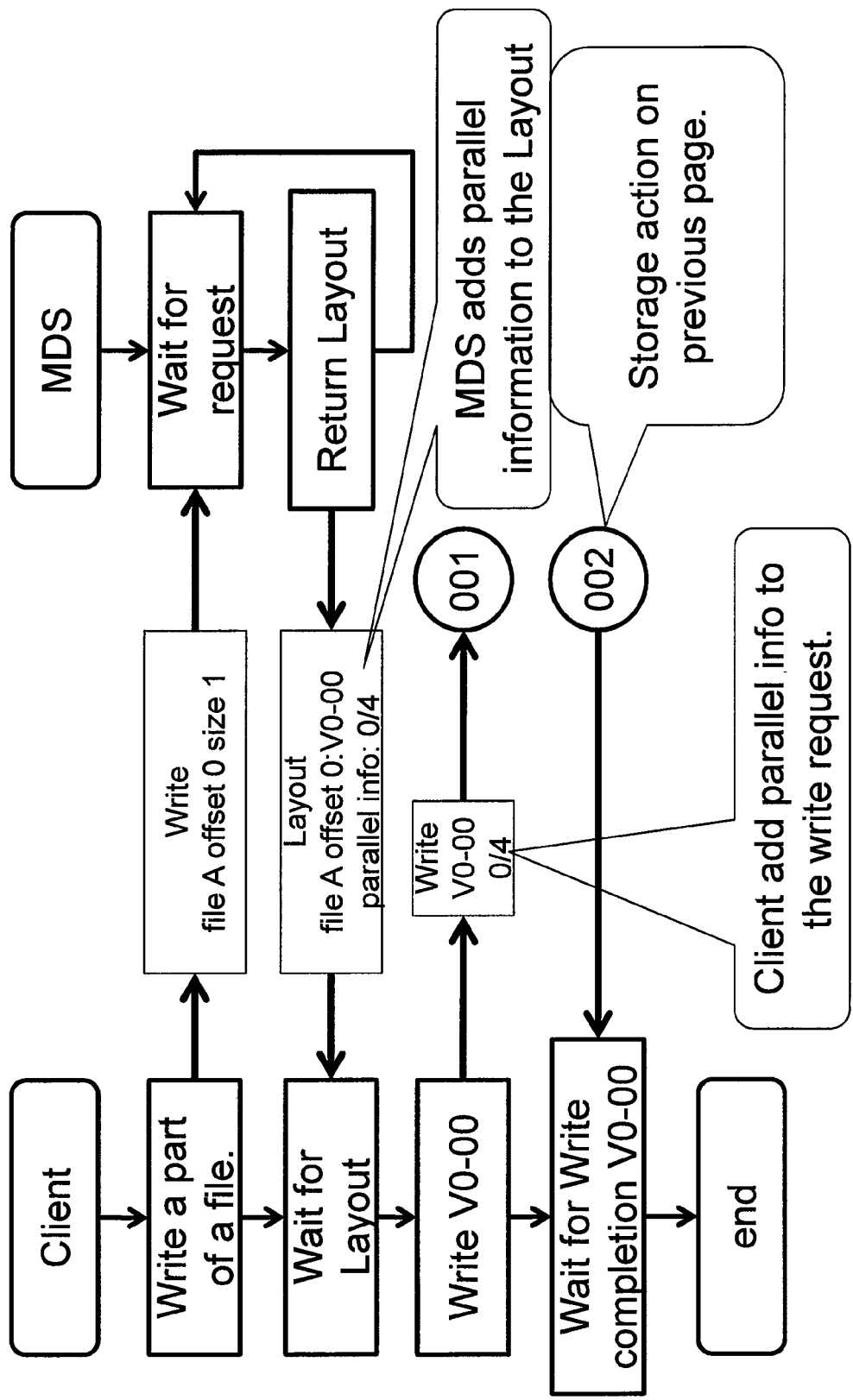
FIG. 11 illustrates an example of a pNFS write process showing changes as compared to FIG. 6 according to an embodiment of the present invention.

FIG. 11 illustrates an example of a pNFS write process showing changes as compared to FIG. 6 according to an embodiment of the present invention. FIG. 11 is almost the same as FIG. 6. There are differences in the layouts and the write requests include parallel information. When a client wants to write data to a file, it sends a write request along with pNFS protocol to the MDS. The MDS write process waits for a write request from the clients. Once it receives the write request, it returns the layout of the data that should be written in the volumes including the parallel information to the client. The parallel information has two parts. One part is the index indicating the position of this data in the stripe width. The other part is the stripe width indicating into how many volumes the file data is striped. We describe parallel information here as "index/stripe width." When the client receives the layout, it sends the write request along with SCSI protocol including the parallel information to the storage system. In the SCSI write command, there is no definition to store the parallel information; thus, one can allocate the parallel information to its reserved area, for example. The storage write process waits for a write request from the clients. Once it receives the write request, it checks whether the target region of the virtual volume has already been allocated a page or not. If it has not, the storage write process chooses a page from the parallel group which satisfies the previous formula (P mod N=n) in the storage pool and allocates the page to the target region of the virtual volume. It then writes data to the region and notifies the completion of data write when the data has been written to the region. When the client receives the write completion notification from the storage system, the process is finished.

Figure 12:
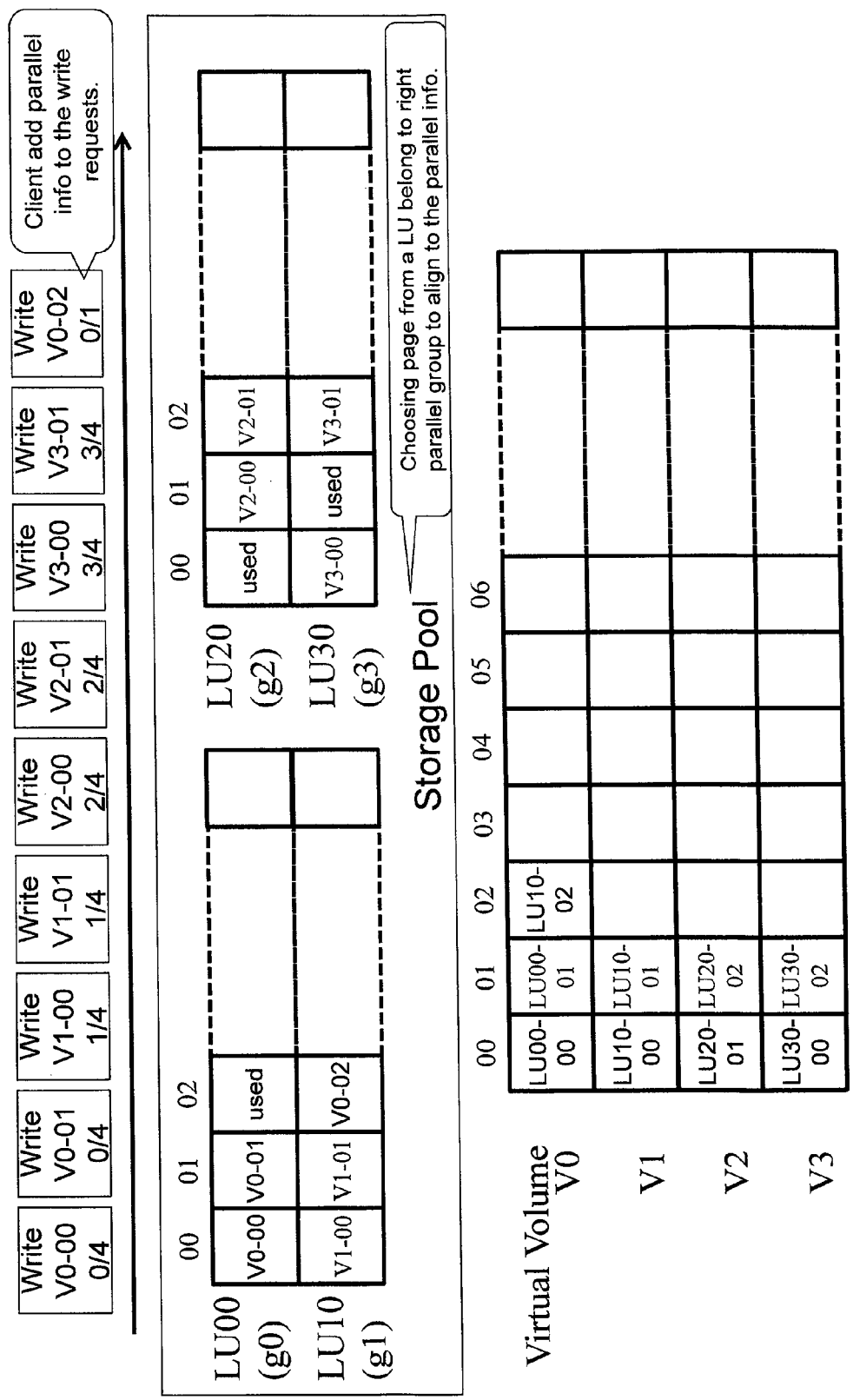
FIG. 12 illustrates an example of a flow diagram of standard pNFS data written to the thin provisioned virtual volume showing changes as compared to FIG. 8 according to an embodiment of the present invention.

FIG. 12 illustrates an example of a flow diagram of standard pNFS data written to the thin provisioned virtual volume showing changes as compared to FIG. 8 according to an embodiment of the present invention. FIG. 12 is similar to FIG. 8, but the page choosing algorithm is different. When clients request data write to the storage system at random sequence, the page allocation process allocates pages. Then, the pages in the virtual volumes are allocated. The allocation is aware of the parallel information. We choose the number of parallel groups from the stripe width of the parallel information in the write request. In the first write request case, it has the parallel information 0/4. In this case, the stripe size is 4, the number of parallel groups is 4, and we choose 4 of parallel groups (g0 g1 g2 g3). We choose the LU from the parallel groups from the index in the parallel information of the write request. For index 0, allocate from the LUs in the g0 (It is LU00. If there are many LUs in g0, any LUs can be chosen.). The indices 1, 2, 3 are also LU10, 20, 30.

Figure 13:
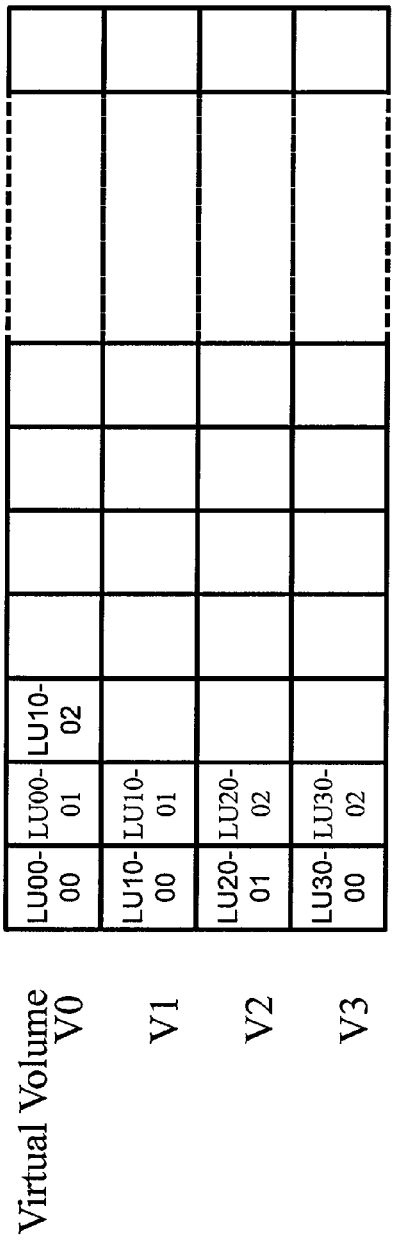
FIG. 13 illustrates an example of what happens to parallel read in the page allocation case of FIG. 12.
Figure 13:
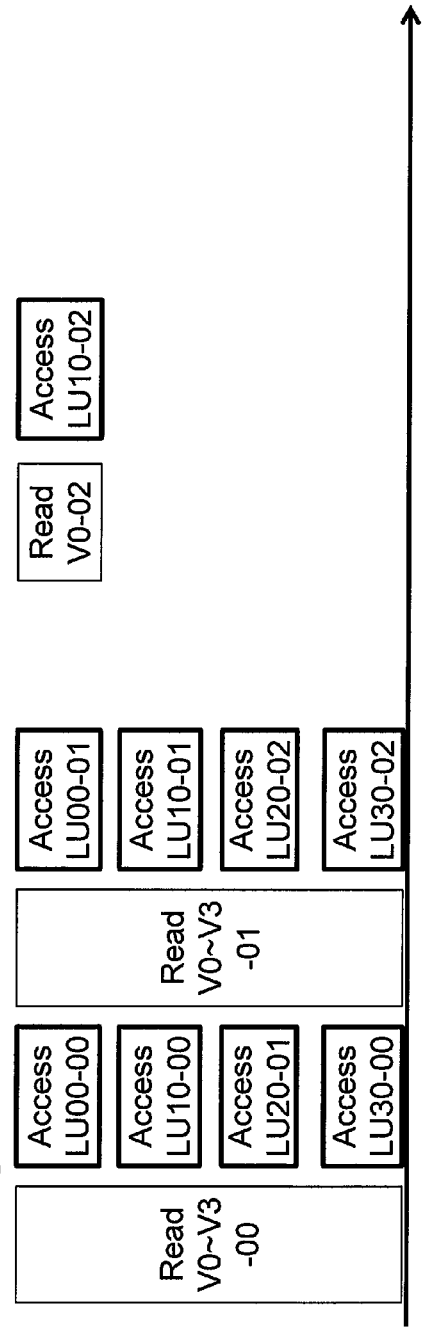

FIG. 13 illustrates an example of what happens to parallel read in the page allocation case of FIG. 12. When the client starts to read a file sequentially, the client sends read requests for each virtual volume in the stripe size. The storage system executes each virtual volume's storage read process when it receives the read request to the virtual volume. All requests go to the different parallel group LUs. They can process the read request simultaneously because the parallel group is defined or configured to do so. Thus, the data will be read simultaneously as shown at the bottom of FIG. 13. This shows that the read performance will improve with pNFS supporting the parallel read function.

Of course, the system configuration illustrated in FIG. 2 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for a network file sharing system with storage thin provisioning management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An information system comprising:
   a storage system including a processor, a memory, and a plurality of virtual volumes to be allocated pages from a storage pool of volumes; and
   a metadata server which, upon receiving from a client a write request containing file data to be written to virtual volumes in the storage system, assigns parallel information for parallel data access and returns the write request to the client with the parallel information which is added to a data layout of the file data to be written in the plurality of virtual volumes which are allocated pages from the storage pool of volumes;
   wherein the storage system, upon receiving the write request, from the client, with the parallel information assigned by the metadata server, allocates, based on the parallel information, pages from the storage pool to the plurality of virtual volumes for writing the file data, so that the data layout is striped and the allocated pages fit striped data access according to the striped data layout among the plurality of virtual volumes;
   wherein the parallel information assigned to the write request by the metadata server has two parts, a first part being an index indicating a position of the file data in a stripe width and a second part being the stripe width indicating into how many volumes the file data is striped; and
   wherein the storage system selects pages from the storage pool to be allocated to the virtual volume for writing the file data according to P mod N=n, where P is a number representing parallel capacity of the storage pool, the parallel capacity meaning how many volumes can be accessed simultaneously, where N is the stripe width of the parallel information, and where n is the index of the parallel information.

2. The information system according to claim 1, wherein the stripe width is determined by file size of the file data and configuration of the volumes.

3. The information system according to claim 2, wherein a stripe size is a data size representing a unit size to stripe file data to the virtual volumes in the storage pool; and
   wherein if the file size is smaller than the stripe size, the stripe width is 1, if the file size is larger than the stripe size and smaller than twice the stripe size, the stripe width is 2, and if the file size is larger than a product of a number of the virtual volumes in the storage pool multiplied by the stripe size, the stripe width is the number of virtual volumes.

4. The information system according to claim 1, wherein for each page allocation, the storage system selects a page from a parallel group which satisfies P mod N=n in the storage pool and allocates the page to a target region of the virtual volume, the storage pool including P number of parallel groups; and wherein logical units in each parallel group can be operated simultaneously to execute read/write data transfer simultaneously.

5. The information system according to claim 4, wherein the logical units in each parallel group are controlled by a same storage controller of the storage system.

6. The information system according to claim 4, wherein the logical units in each parallel group belong to a same RAID group or a same hard disk drive.

7. A storage system comprising:
   a processor;
   a memory;
   a plurality of virtual volumes to be allocated pages from a storage pool of volumes; and
   a storage write module configured to receive a write request with parallel information for parallel data access, the write request containing file data to be written to virtual volumes in the storage system, the parallel information being assigned by a metadata server and added by the metadata server to a data layout of the file data to be written in the plurality of virtual volumes which are allocated pages from the storage pool of volumes,
   wherein the storage write module, upon receiving the write request, from the client, with the parallel information assigned by the metadata server, allocates, based on the parallel information, pages from the storage pool to the plurality of virtual volumes for writing the file data, so that the data layout is striped and the allocated pages fit striped data access according to the striped data layout among the plurality of virtual volumes;

wherein the parallel information assigned to the write request by the metadata server has two parts, a first part being an index indicating a position of the file data in a stripe width and a second part being the stripe width indicating into how many volumes the file data is striped; and wherein the storage write module selects pages from the storage pool to be allocated to the virtual volume for writing the file data according to P mod N=n, where P is a number representing parallel capacity of the storage pool, the parallel capacity meaning how many volumes can be accessed simultaneously, where N is the stripe width of the parallel information, and where n is the index of the parallel information.

8. The storage system according to claim 7, wherein the stripe width is determined by file size of the file data and configuration of the volumes.

9. The storage system according to claim 8, wherein a stripe size is a data size representing a unit size to stripe file data to the virtual volumes in the storage pool; and wherein if the file size is smaller than the stripe size, the stripe width is 1, if the file size is larger than the stripe size and smaller than twice the stripe size, the stripe width is 2, and if the file size is larger than a product of a number of the virtual volumes in the storage pool multiplied by the stripe size, the stripe width is the number of virtual volumes.

10. The storage system according to claim 7, wherein for each page allocation, the storage write module selects a page from a parallel group which satisfies P mod N=n in the storage pool and allocates the page to a target region of the virtual volume, the storage pool including P number of parallel groups; and wherein logical units in each parallel group can be operated simultaneously to execute read/write data transfer simultaneously.

11. The storage system according to claim 10, wherein the logical units in each parallel group are controlled by a same storage controller of the storage system.

12. The storage system according to claim 11, wherein the logical units in each parallel group belong to a same RAID group or a same hard disk drive.

13. A page allocation method in a system which includes a storage system, a metadata server, and a client coupled via a network, the storage system including a processor, a memory, and a plurality of virtual volumes to be allocated pages from a storage pool of volumes, the method comprising:

adding, by the metadata server, parallel information for parallel data access to a data layout of file data which is contained in a write request from the client and which is to be written in the plurality of virtual volumes in the storage system that are allocated pages from the storage pool of volumes;

receiving, by the storage system, the write request from the client having the parallel information assigned by the metadata server;

allocating by the storage system, based on the parallel information assigned by the metadata server, pages from the storage pool to the plurality of virtual volumes for writing the file data, so that the data layout is striped and the allocated pages fit striped data access according to the striped data layout among the plurality of virtual volumes;

wherein the parallel information assigned to the write request by the metadata server has two parts, a first part being an index indicating a position of the file data in a stripe width and a second part being the stripe width indicating into how many volumes the file data is striped; and selecting, by the storage system, pages from the storage pool to be allocated to the virtual volume for writing the file data according to P mod N=n, where P is a number representing parallel capacity of the storage pool, the parallel capacity meaning how many volumes can be accessed simultaneously, where N is the stripe width of the parallel information, and where n is the index of the parallel information.

14. The page allocation method according to claim 13, further comprising: for each page allocation, selecting by the storage system a page from a parallel group which satisfies P mod N=n in the storage pool and allocates the page to a target region of the virtual volume, the storage pool including P number of parallel groups;

wherein logical units in each parallel group can be operated simultaneously to execute read/write data transfer simultaneously.

* * * * *